Oct. 14, 1924.
J. DWYER
1,511,953
DRAINING DEVICE
Filed June 6, 1921
2 Sheets-Sheet 1
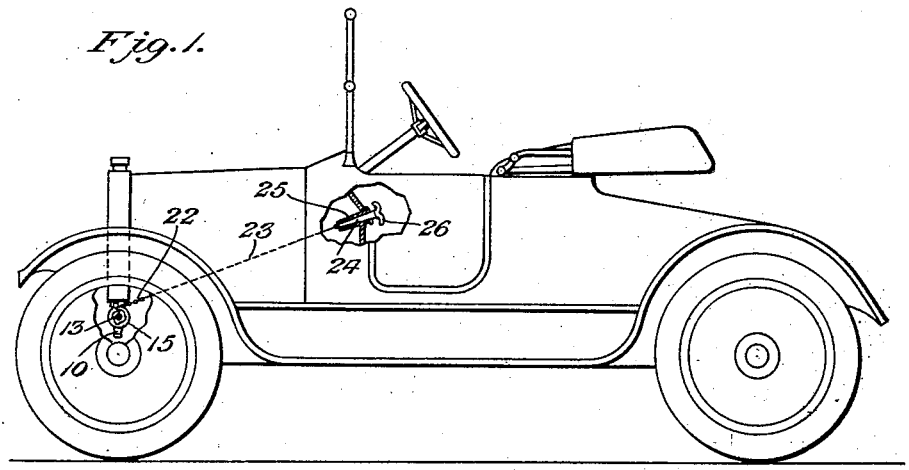
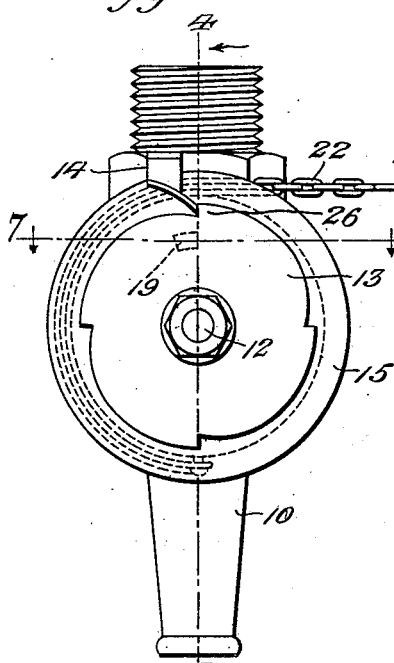
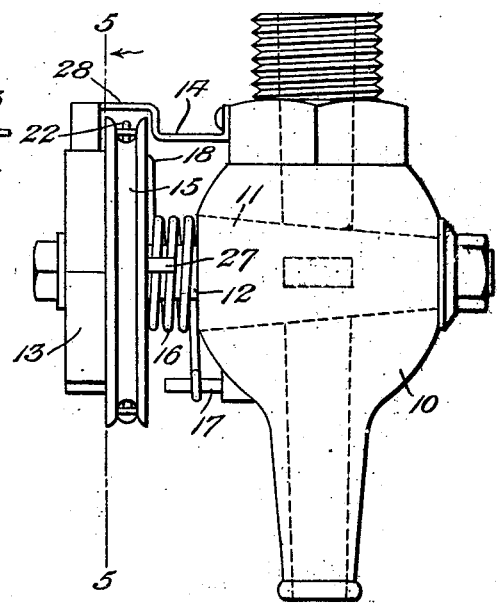
James Dwyer INVENTOR
BY Victor J. Evans ATTORNEY

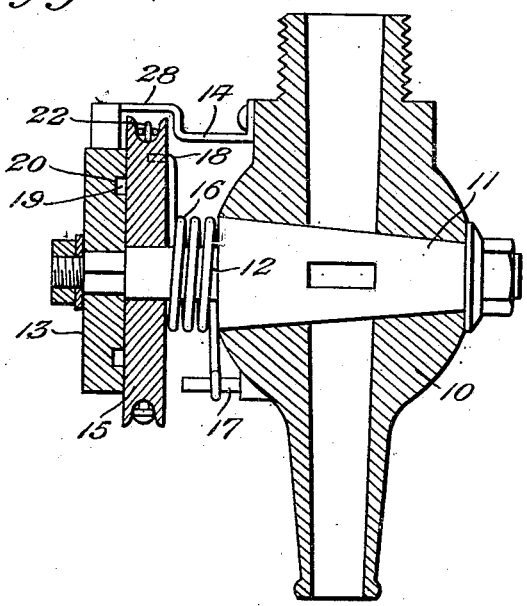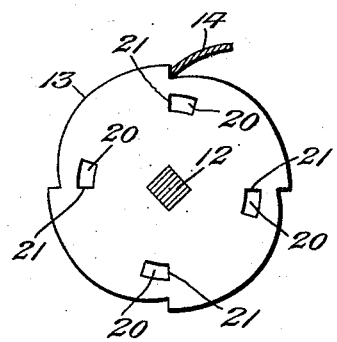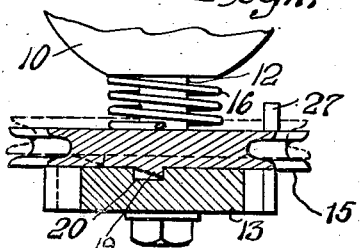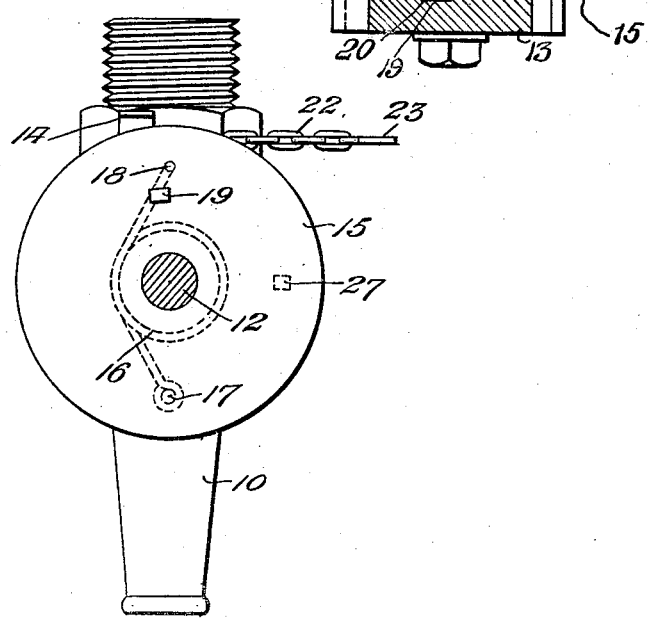

Patented Oct. 14, 1924.

1,511,953

UNITED STATES PATENT OFFICE.

JAMES DWYER, OF COLORADO SPRINGS, COLORADO.

DRAINING DEVICE.

Application filed June 6, 1921. Serial No. 475,365.

*To all whom it may concern:*

Be it known that I, JAMES DWYER, a citizen of the United States, residing at Colorado Springs, in the county of El Paso and State of Colorado, have invented new and useful Improvements in Draining Devices, of which the following is a specification.

This invention relates to improvements in automobiles and has particular relation to the cooling systems of internal combustion engines.

An object of the present invention is to provide means whereby the cooling system of an internal combustion engine may be emptied in a convenient manner from the driver's seat and thus obviate the necessity of reaching beneath the automobile radiator to manipulate the drain cock.

A further object of the invention is the provision of a drain cock of novel construction, which is especially adapted for the above purpose, the construction being such that the cock may be operated to properly open the same and held in open position and automatically closed when released.

With the above and other objects in view, the invention further includes the following novel features and details of construction, to be hereinafter more fully described, illustrated in the accompanying drawings and pointed out in the appended claims.

In the drawings:—

Figure 1 is a skeleton view of an automobile with the invention applied thereto.

Figure 2 is an enlarged side view of the improved drain cock.

Figure 3 is a view at right angles to Figure 2.

Figure 4 is a section on the line 4—4 of Figure 2.

Figure 5 is a section on the line 5—5 of Figure 3 looking in the direction of the arrow.

Figure 6 is a similar view looking in an opposite direction.

Figure 7 is a section on the line 7—7 of Fig. 2 looking in the direction of the arrows.

Referring in detail to the drawings, wherein like characters of reference denote corresponding parts, the reference character 10 indicates a drain cock which may be secured at a convenient point within the cooling system of an automobile engine for the purpose of draining the system. This cock may be of any desired structure which includes a rotatable member or plug 11 from which extends a stem 12, the latter being rotated to open and close the cock, as will be readily understood.

As previously stated, it is the purpose of the invention to provide means for operating the cock from the driver's seat of the automobile and for this purpose there is secured to the stem 12 a toothed wheel 13 while extending from the drain cock casing is a spring arm 14 which engages the teeth of the wheel 13 to prevent rotation of the wheel in one direction. Mounted to rotate freely on the stem 12 is a grooved wheel 15 which is yieldingly forced into engagement with the wheel 13 by means of a spring 16. One end of this spring is secured to an arm 17 which extends through the cock casing while the opposite end of the spring is secured to the grooved wheel 15 as shown at 18. Thus, in addition to yieldingly holding the wheel 15 in contact with the wheel 13, the spring further acts to impart a rotary movement to the wheel 15.

Extending from one face of the grooved wheel 15 is a tooth 19 which is adapted to enter oppositely arranged grooves 20 formed in the adjacent face of the wheel 13. These grooves are provided with shoulders 21 against which the tooth 19 engages when the wheel 15 is rotated in one direction, rotation in an opposite direction permitting the tooth an unobstructed movement so that no movement is imparted to the wheel 13.

Secured to the wheel 15 within its grooved periphery is a flexible member or chain 22 while secured to the flexible member or chain is a rod or wire 23 which extends to a lever 24 mounted within the dash of the automobile. This lever is tapered and operates in a tapered guide 25 which extends through the dash and carries an operating handle or grip 26. Normally the lever is wedged within the guide, but may be pulled outward to operate the drain cock.

In the operation of the invention, the lever 24 is pulled outward to exert a rearward pull upon the rod or wire 23. This acts to rotate the grooved wheel 15, which through the engagement of the tooth 19 and shoulder 21 will rotate the wheel 13 and open the cock 10. This rotary movement acts to tension the spring 16, while a stop 27 carried by the wheel 15 will engage the arm 17 so as to limit the movement of the wheel in one direction. The cock may remain in open position until the cooling system has been thoroughly drained, the wheel 15 returning to its normal position, due to the action of the spring 16 and the ratchet connection between the wheels 13 and 15, this action occurring when the lever 24 is released. A further operation of the lever 24 will again rotate the grooved wheel 15, whereupon the tooth 19 will again engage the shoulder 21 and operate the wheel 13 to close the cock.

The arm 14 is arched as shown at 28 so as to pass over the periphery of the grooved wheel 15 for engagement with the teeth of the wheel 13. In addition, this arch provides a guide for retaining the flexible member or chain 22 within the grooved wheel 15.

The invention is susceptible of various changes in its form, proportions and minor details of construction and the right is herein reserved to make such changes as properly fall within the scope of the appended claims.

Having described the invention what is claimed is:—

1. A valve including a rotary valve member, a stem extending therefrom, a toothed wheel secured upon the stem, a grooved wheel mounted for free rotation upon the stem, a flexible element operating in the groove, whereby the wheel may be rotated, means extending from the face of one wheel for detachable engagement with the adjacent face of the other wheel, whereby rotation of the free wheel will rotate the toothed wheel in one direction and means engageable with the toothed wheel to prevent rotation of the latter in an opposite direction and to guide the flexible element within the groove.

2. A valve including a rotary valve member, a stem extending therefrom, a toothed wheel secured upon the stem, a grooved wheel mounted for free rotation upon the stem, a flexible member engageable in the grooved wheel, whereby the latter may be rotated, means whereby rotation of the grooved wheel will impart rotary movement to the toothed wheel in one direction only, an arm extending from the valve and engageable with the toothed wheel to prevent rotation of the latter in one direction and an arch included in the arm and extending from the grooved wheel to provide a guide for the flexible member.

In testimony whereof, I affix my signature.

JAMES DWYER.